W. GOLDBERG.
CLUTCH DEVICE.
APPLICATION FILED JULY 15, 1908.
951,882.
Patented Mar. 15, 1910.
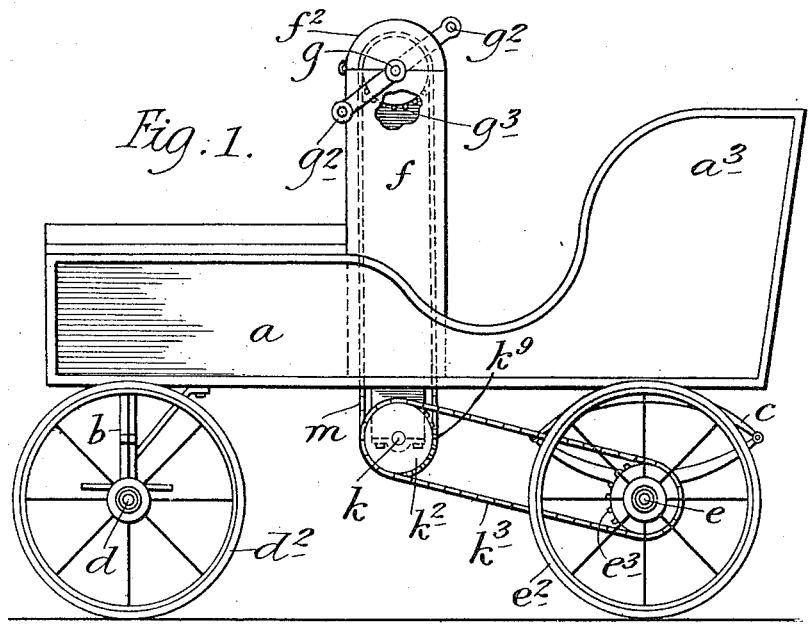
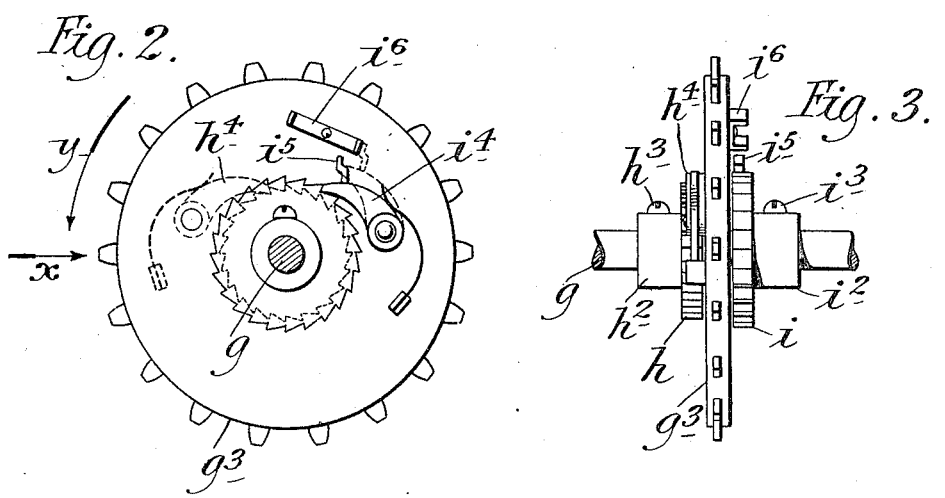
WITNESSES:
INVENTOR
Wolf Goldberg.
BY
ATTORNEYS

UNITED STATES PATENT OFFICE.

WOLF GOLDBERG, OF NEW YORK, N. Y.

CLUTCH DEVICE.

951,882. Specification of Letters Patent. Patented Mar. 15, 1910.

Application filed July 15, 1908. Serial No. 443,624.

*To all whom it may concern:*

Be it known that I, WOLF GOLDBERG, a citizen of the United States, and residing at New York, in the county of New York and State of New York, have invented certain new and useful Improvements in Clutch Devices, of which the following is a specification, such as will enable those skilled in the art to which it appertains to make and use the same.

This invention relates to clutch devices for use in connection with the propelling mechanism of hand propelled vehicles, and the object thereof is to provide an improved device or apparatus of this class, by means of which the operator may at any time, as for instance in going down hill, throw the driving gear out of connection so that the vehicle will coast freely or run under its own momentum; and with this and other objects in view the invention consists in a device or apparatus of the class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of a vehicle embodying my invention with part of the construction broken away; Fig. 2 a transverse sectional view of the main driving shaft and showing the main driving sprocket mounted thereon and other details of construction connected therewith, and;—Fig. 3 a view at right angles to that shown in Fig. 2 and looking in the direction of the arrow $x$.

In the drawing forming part of this specification I have shown a vehicle comprising a body $a$, which is connected by means of springs $b$ and $c$, or other devices, in any desired manner, with the axles $d$ and $e$, and the axles $d$ and $e$ are provided with wheels $d^2$ and $e^2$, and the rear axle $e$ is provided with a sprocket gear $e^3$.

The vehicle shown in the drawing is made somewhat in the form of an automobile, and the body thereof is provided with a raised seat portion $a^3$, forwardly of which and midway of the vehicle and the body $a$ thereof is a vertically arranged casing or support $f$, in the top of which is mounted a transverse main drive shaft $g$ which is provided at its opposite ends with cranks $g^2$.

Mounted loosely and centrally on the shaft $g$ is a main sprocket gear $g^3$ at the opposite sides of which are ratchets $h$ and $i$ having hubs $h^2$ and $i^2$, and the ratchets $h$ and $i$ are secured to the shaft $g$ preferably by means of set screws $h^3$ and $i^3$. Pivoted to the side of the wheel $g^3$ adjacent to the ratchet $i$ is a spring operated pawl $i^4$ which operates in connection with said ratchet, and pivoted to the side of the wheel $g^3$ adjacent to the ratchet $h$ is a spring operated pawl $h^4$ which operates in connection with said ratchet $h$.

The pawl $i^4$ is provided with a finger $i^5$, and pivoted adjacent thereto is a pawl tripper $i^6$ which is adapted to be operated in connection with the finger $i^5$ to throw the pawl $i^4$ out of engagement with the ratchet $i$, and the casing $f$ is provided with a hinged top $f^2$ which may be opened for the purpose of operating the tripper $i^6$.

Suspended beneath and transversely of the bottom of the body $a$ is a supplemental drive shaft $k$ provided with a sprocket gear $k^2$ geared in connection with the gear $e^3$ on the rear axle $e$ by means of a drive chain $k^3$. The supplemental shaft $k$ is also provided with a sprocket gear $k^9$ which is geared in connection with the main sprocket gear $g^3$ by means of a drive chain $m$, and this construction as shown and described constitutes the driving mechanism of the vehicle.

The vehicle is driven, as will be understood, by turning the shaft $g$ by means of the cranks $g^2$, which operation as will be understood, is performed by hand and in the propulsion of the vehicle the main drive gear $g^3$ is turned in the direction of the arrow $y$ in Fig. 2. In this operation the pawl $h^4$ engages the ratchet $h$ and the wheel $g^3$ is turned in the direction of said arrow $y$, and in this operation the pawl $i^4$ is carried around with the ratchet $i$ maintaining the relative position shown in Fig. 2, and the motion of the shaft $g$ is transmitted through the drive chain $m$, supplemental shaft $k$ and drive chains $k^3$ to the rear axle $e$. If at any time, as for instance, in going down hill it is desired to coast or for the vehicle to run under its own momentum the tripper $i^6$ is operated to throw the pawl $i^4$ out of engagement with the ratchet $i$ and hold it there, and at this time the main drive gear $g^3$ is free to turn independently of the shaft $g$, the pawl $h^4$ moving around freely over the teeth of the ratchet $h$.

The vehicle may, of course, be provided with any suitable brake device, together with any desired steering or guiding mechanism.

Having fully described my invention, what I claim as new and desire to secure by Letters Patent, is:—

In an apparatus of the class described, a shaft, a sprocket wheel rotatably mounted thereon, ratchet wheels secured to said shaft on the opposite side of the sprocket wheel, a spring operated pawl pivoted to one side of said sprocket wheel and operating in connection with the corresponding ratchet wheel, a spring operated pawl pivoted to the opposite side of the sprocket wheel and operating in connection with the corresponding ratchet wheel, said last named pawl being provided near its free end with a projecting finger and a tripper pivoted to the last named side of said sprocket wheel and adapted to operate in connection with said finger to throw said pawl out of engagement with the corresponding ratchet wheel.

In testimony that I claim the foregoing as my invention I have signed my name in presence of the subscribing witnesses this 14th day of July, 1908.

WOLF GOLDBERG.

Witnesses:
A. R. APPLEMAN,
C. E. MULREANY.